Figure 14:
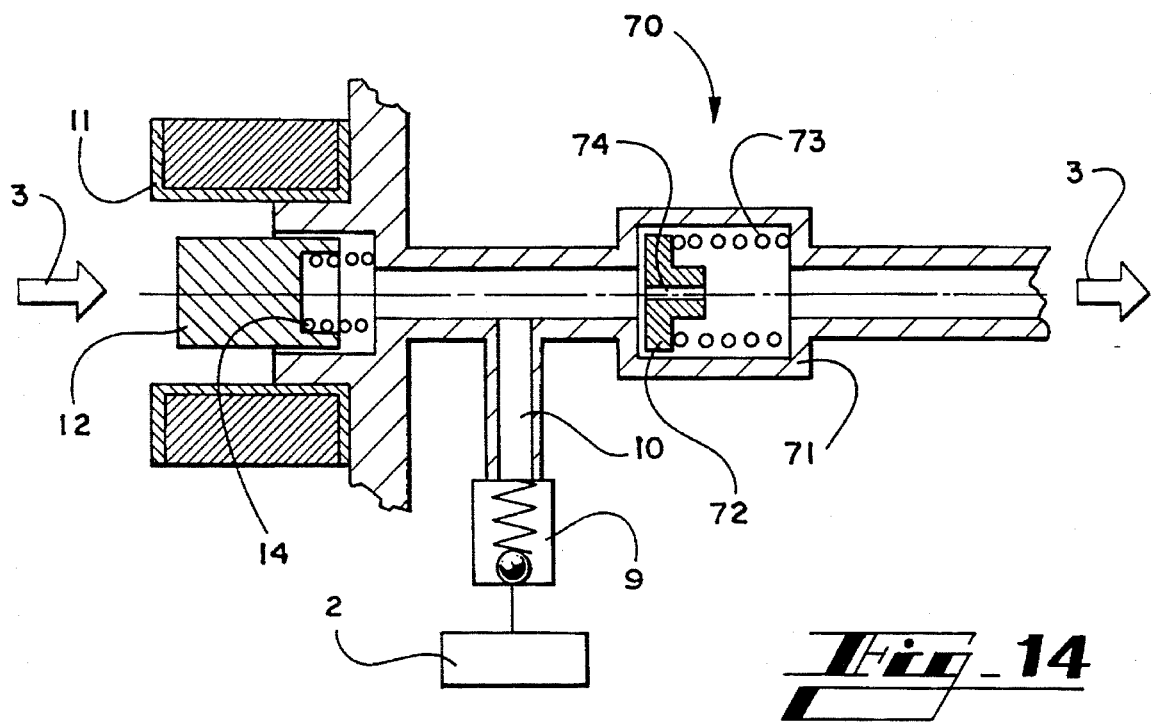

United States Patent [19]

Heimberg

[11] Patent Number: 5,540,206
[45] Date of Patent: Jul. 30, 1996

[54] FUEL INJECTION DEVICE FOR INTERNAL COMBUSTION ENGINES

[75] Inventor: Wolfgang Heimberg, Ebersberg, Germany

[73] Assignee: FICHT GmbH, Kirchseeon, Germany

[21] Appl. No.: 107,835

[22] PCT Filed: Oct. 7, 1991

[86] PCT No.: PCT/EP91/01902

§ 371 Date: Aug. 19, 1993

§ 102(e) Date: Aug. 19, 1993

[87] PCT Pub. No.: WO92/14925

PCT Pub. Date: Sep. 3, 1992

[30] Foreign Application Priority Data

Feb. 26, 1991 [DE] Germany ............... 41 06 015.6

[51] Int. Cl.$^6$ ............................................. F02M 37/04
[52] U.S. Cl. ................................. 123/497; 123/506
[58] Field of Search ....................... 123/497, 499, 123/506, 458, 510

[56] References Cited

U.S. PATENT DOCUMENTS

| | | |
|---|---|---|
| 1,664,667 | 4/1928 | French . |
| 2,666,153 | 1/1954 | McHenry . |
| 3,709,639 | 1/1973 | Suda ................................. 123/499 |
| 3,961,612 | 6/1976 | Okamoto ......................... 123/497 |
| 4,345,565 | 8/1982 | Bottoms ........................... 123/497 |
| 4,599,983 | 7/1986 | Omachi ............................ 123/497 |
| 4,699,103 | 10/1987 | Tsukahara ....................... 123/497 |
| 4,712,528 | 12/1987 | Schaffitz ......................... 123/497 |

FOREIGN PATENT DOCUMENTS

| | | |
|---|---|---|
| 0174261 | 3/1986 | European Pat. Off. . |
| 0324452 | 7/1989 | European Pat. Off. . |
| 598918 | 7/1934 | Germany . |
| 105653 | 5/1974 | Germany . |
| 2307435 | 8/1974 | Germany .............. 123/497 |
| 120514 | 6/1976 | Germany . |
| 2751457 | 5/1979 | Germany . |
| 213472 | 9/1984 | Germany . |
| 1326761 | 7/1987 | U.S.S.R. ............. 123/497 |

*Primary Examiner*—Carl S. Miller
*Attorney, Agent, or Firm*—Jones & Askew

[57] ABSTRACT

A fuel injection device for internal combustion engines has an injection nozzle to which fuel is supplied by means of a pressure device comprising a fuel-accelerating pump and a fuel-retarding device which, when activated, convert the kinetic energy of the accelerated fuel abruptly to a pressure shock wave which causes the fuel to be sprayed through the injection nozzle. According to the invention, an intermittently operated fuel-accelerating pump is used. This pump and the preferably electrically operated retarding device are preferably controlled by a common control device. As a result, the injection device can be operated with very little, optimally utilized energy and can inject fuel in a precisely controllable manner very quickly and when decoupled from the motorized operations.

14 Claims, 9 Drawing Sheets

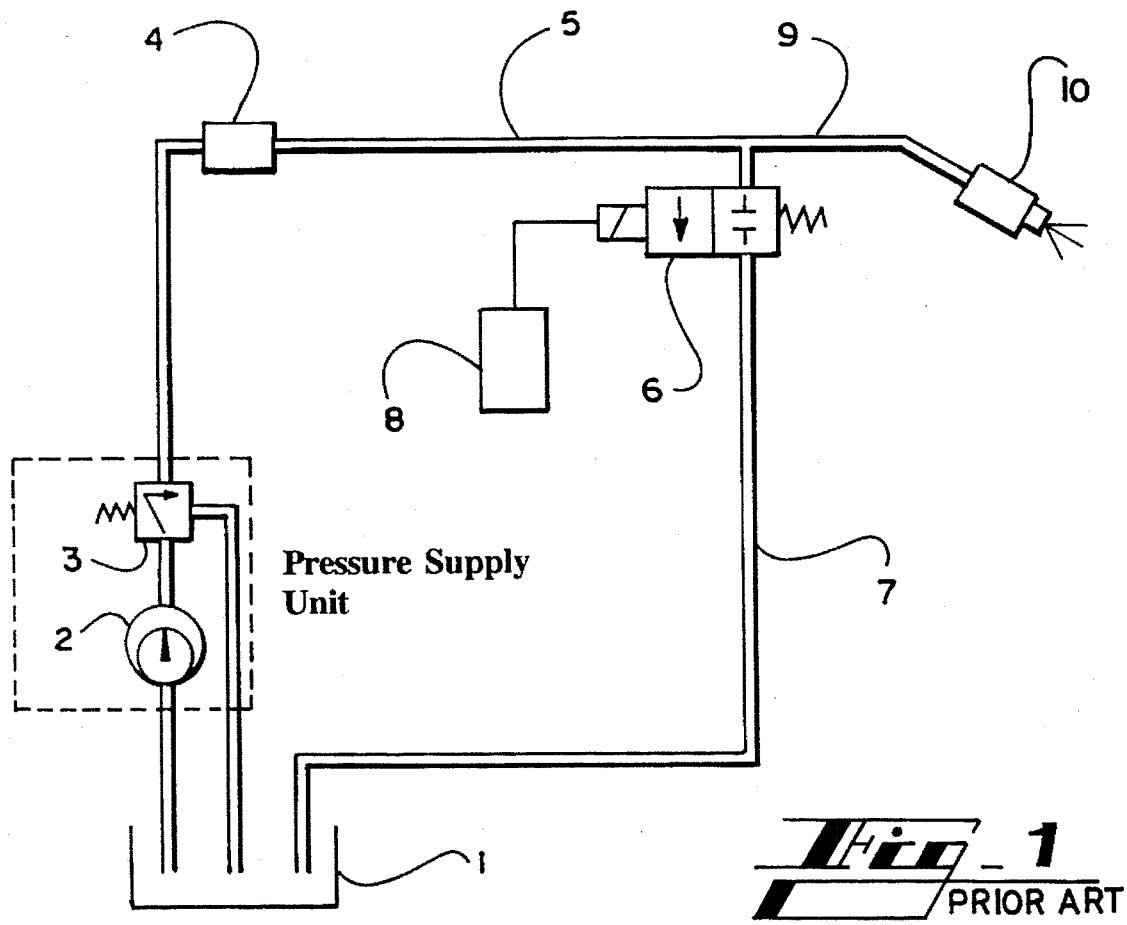
Fig_1 PRIOR ART
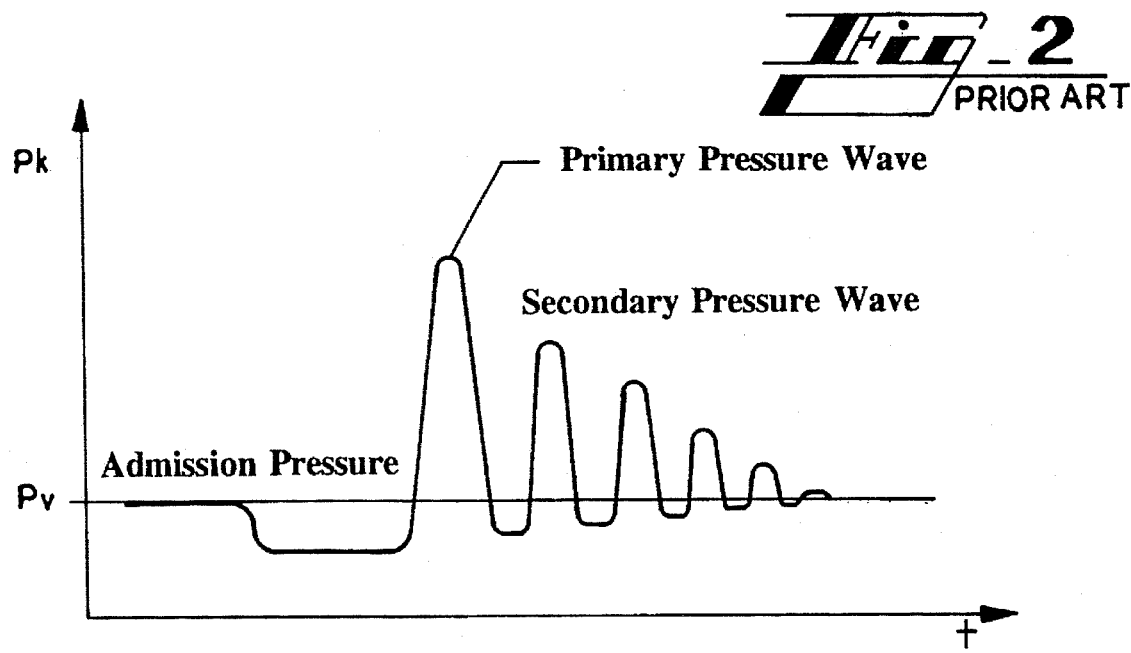
Fig_2 PRIOR ART

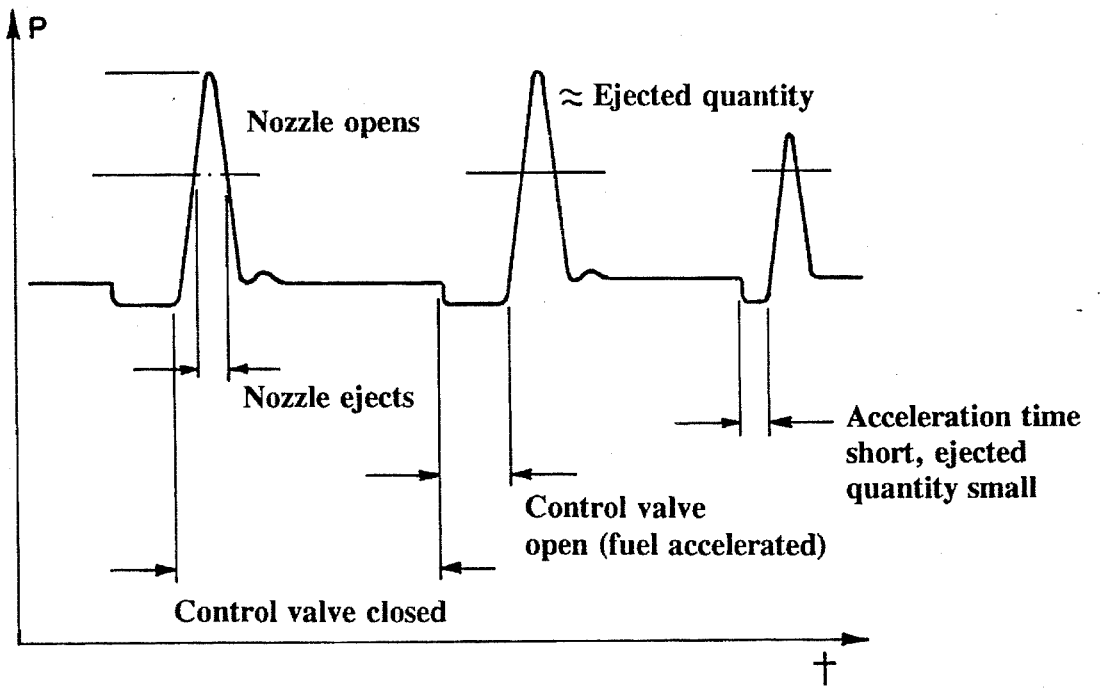
Fig_3 PRIOR ART
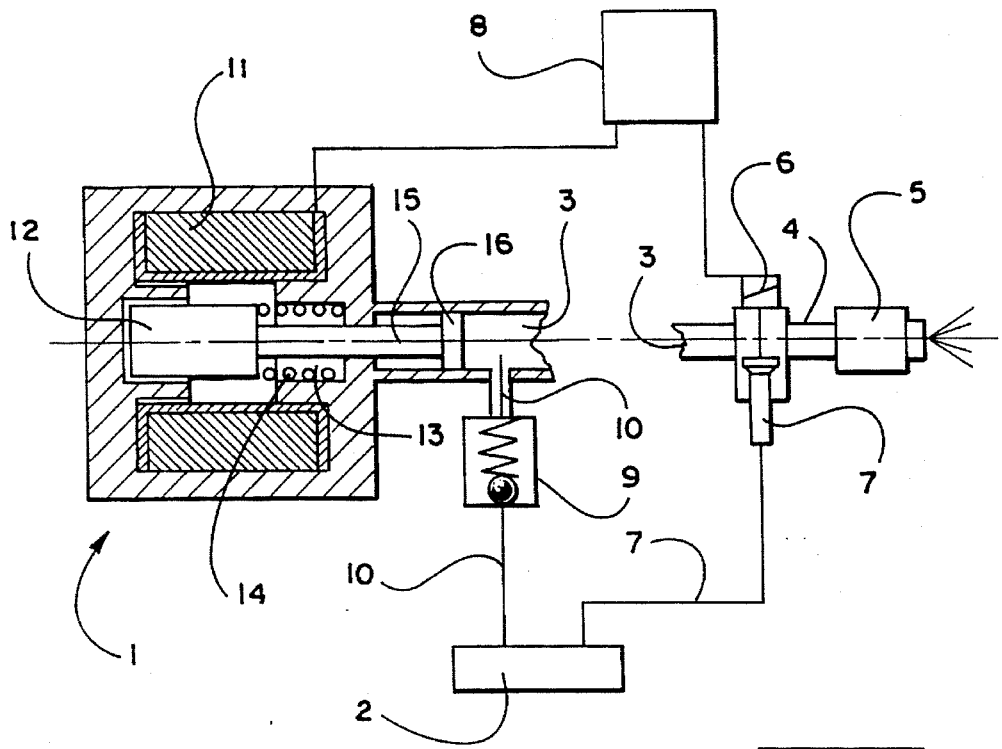
Fig_4

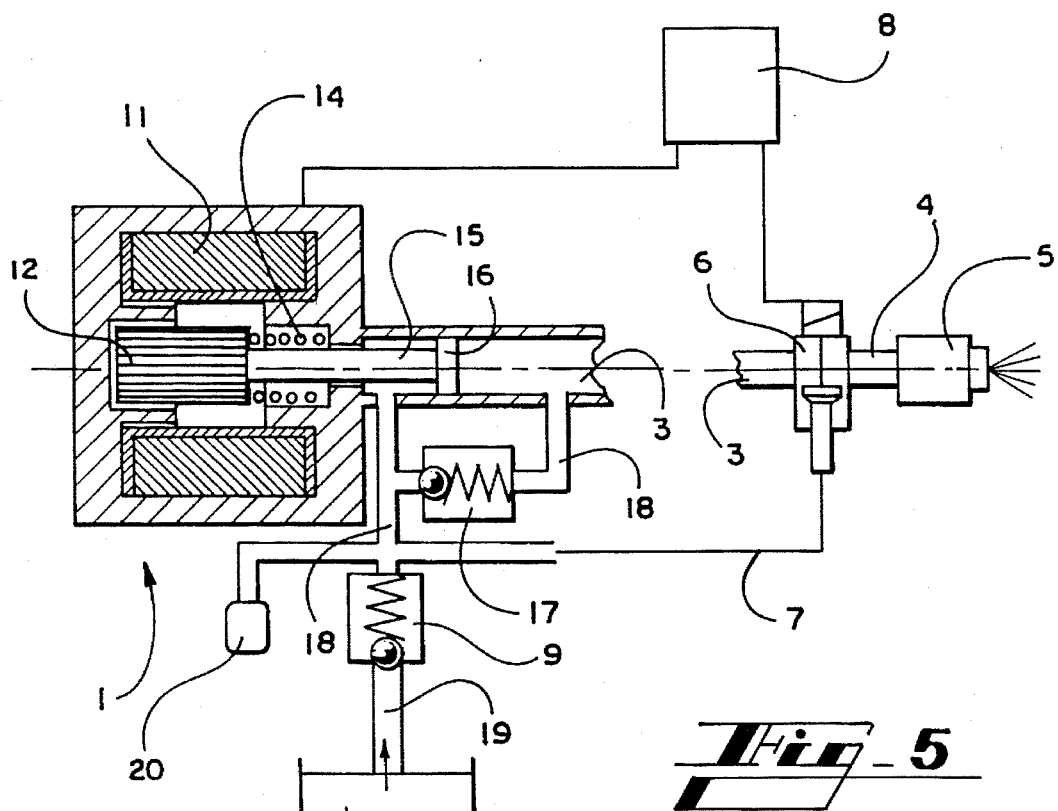
Fig_5
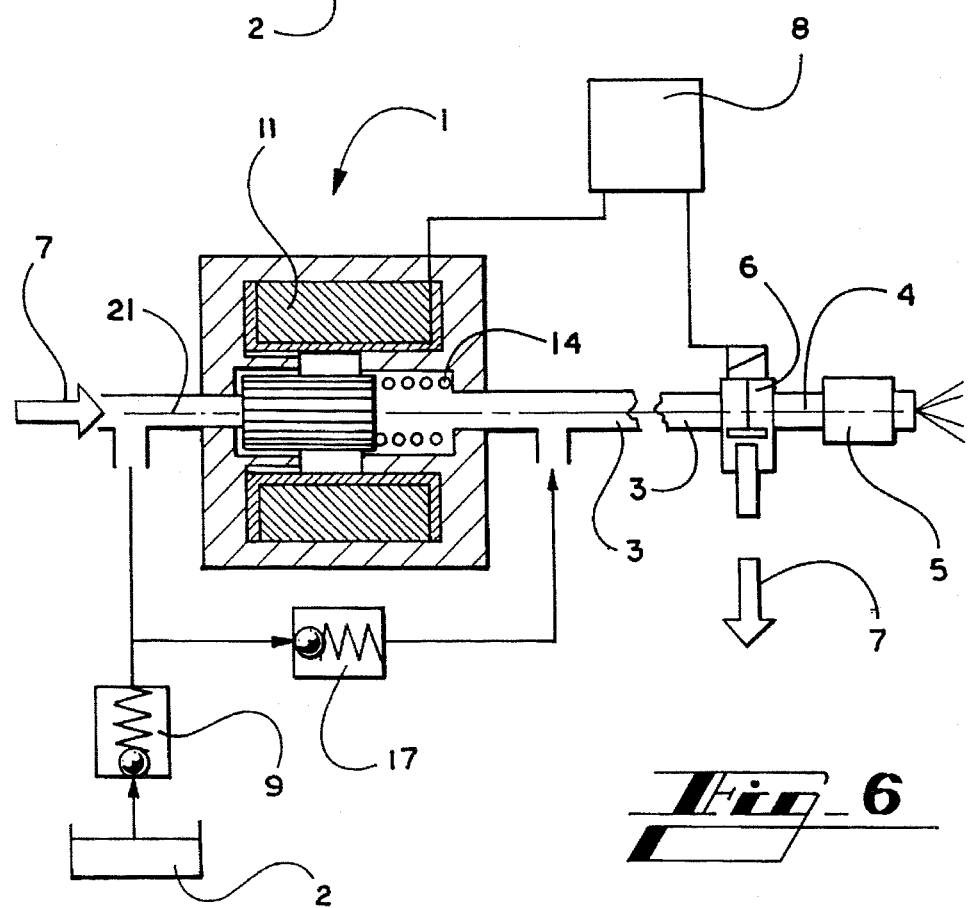
Fig_6

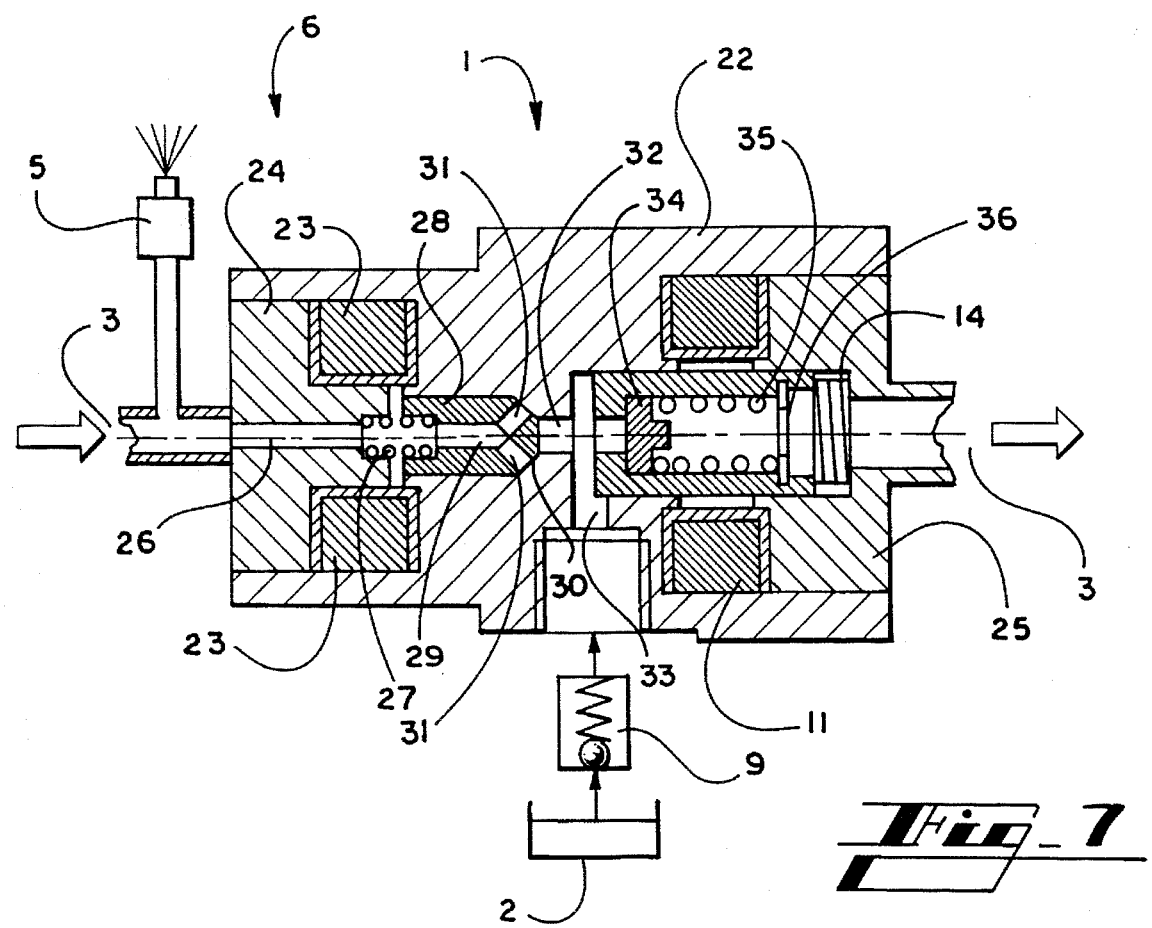
Fig_7
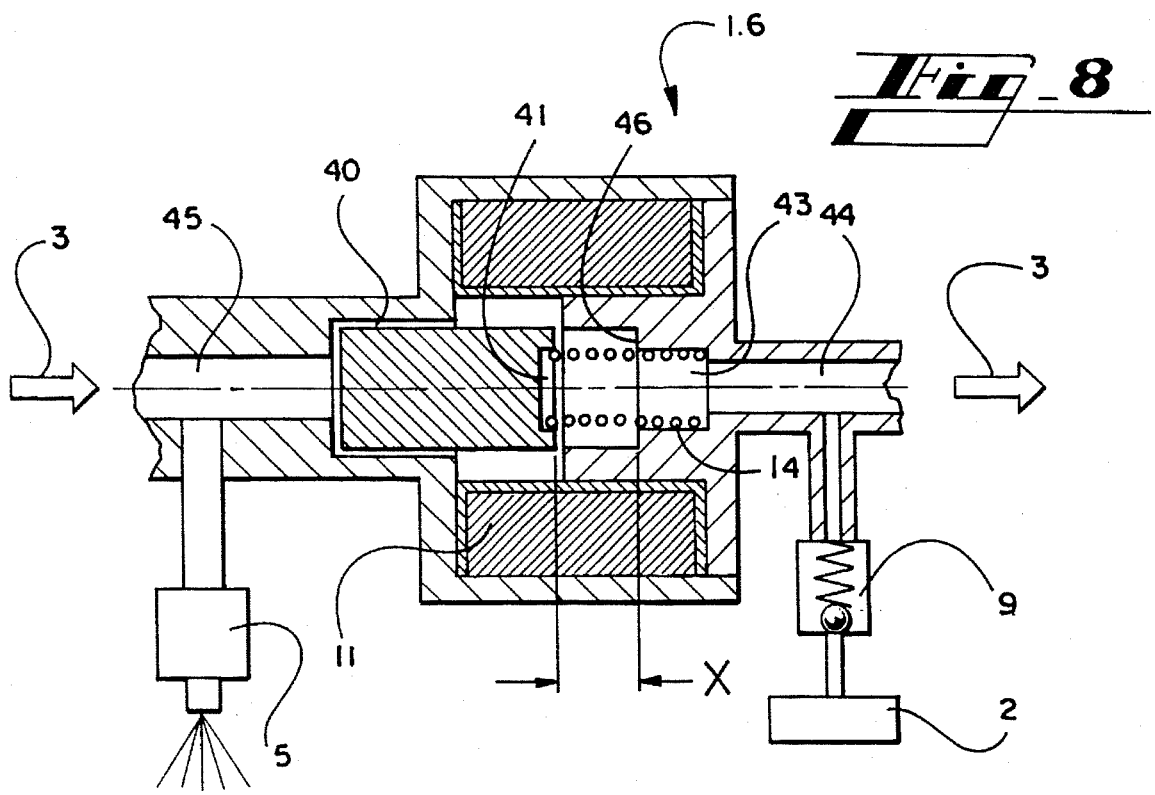
Fig_8

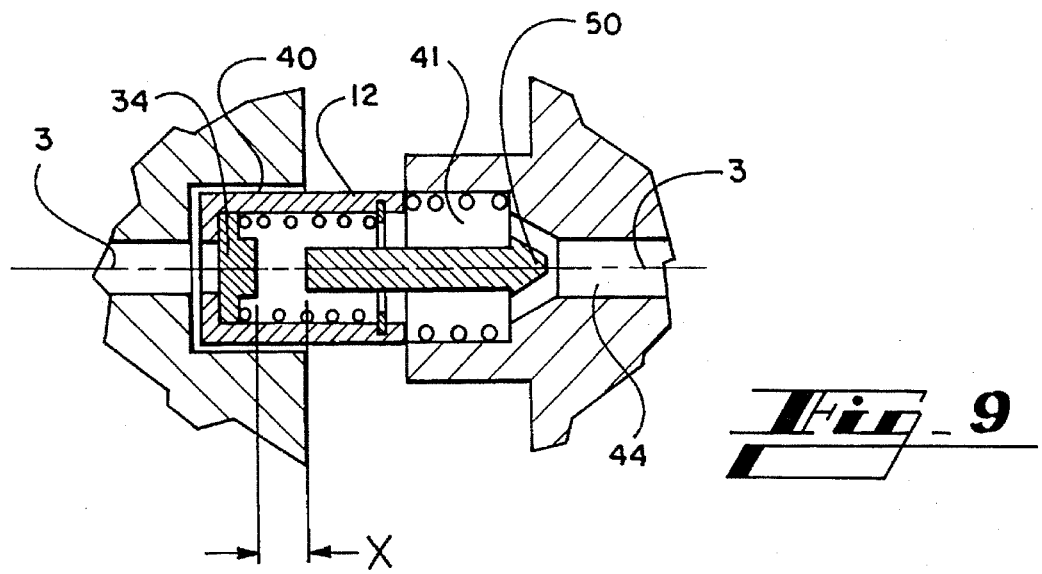
Fig_9
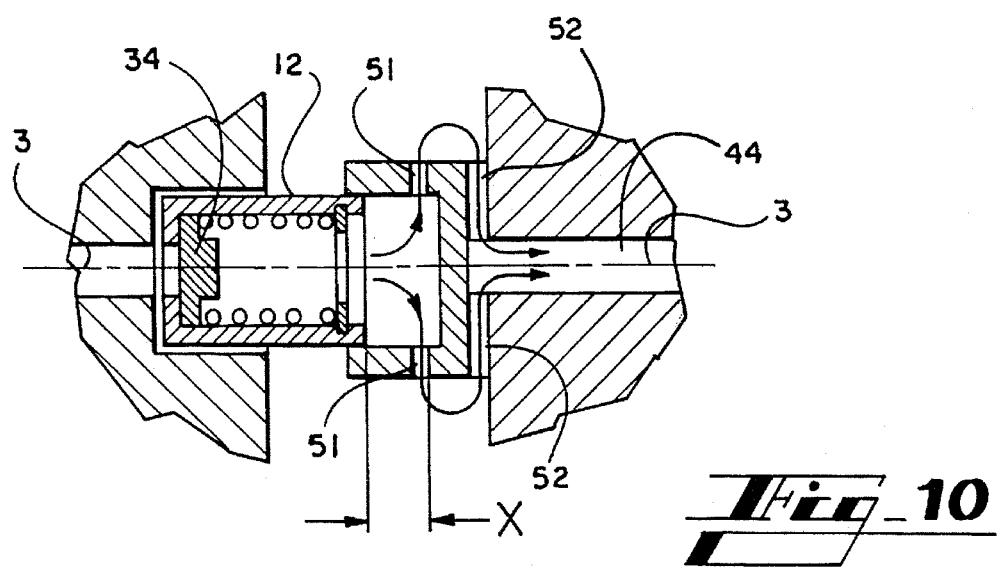
Fig_10
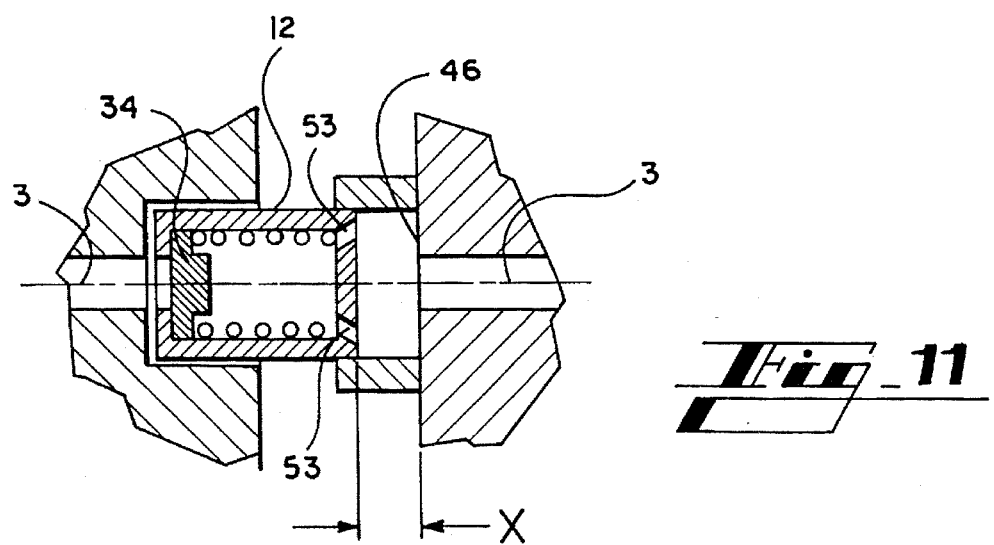
Fig_11

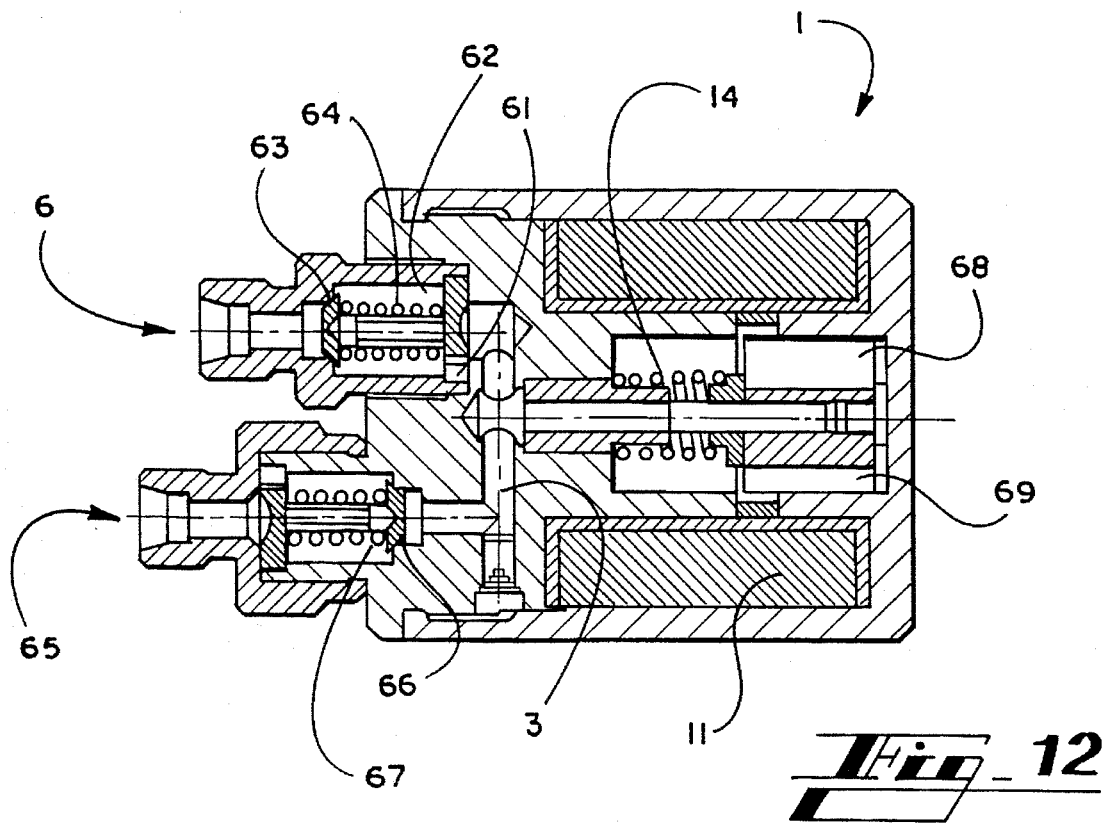
Fig_12
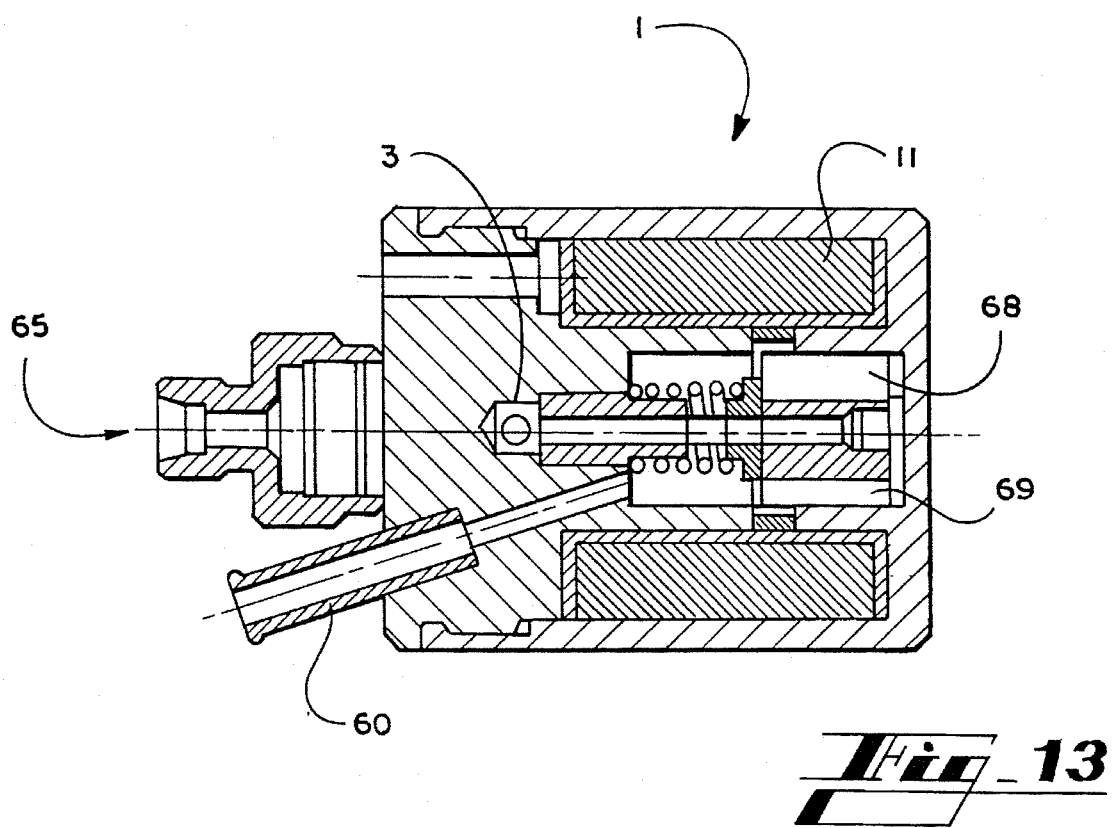
Fig_13

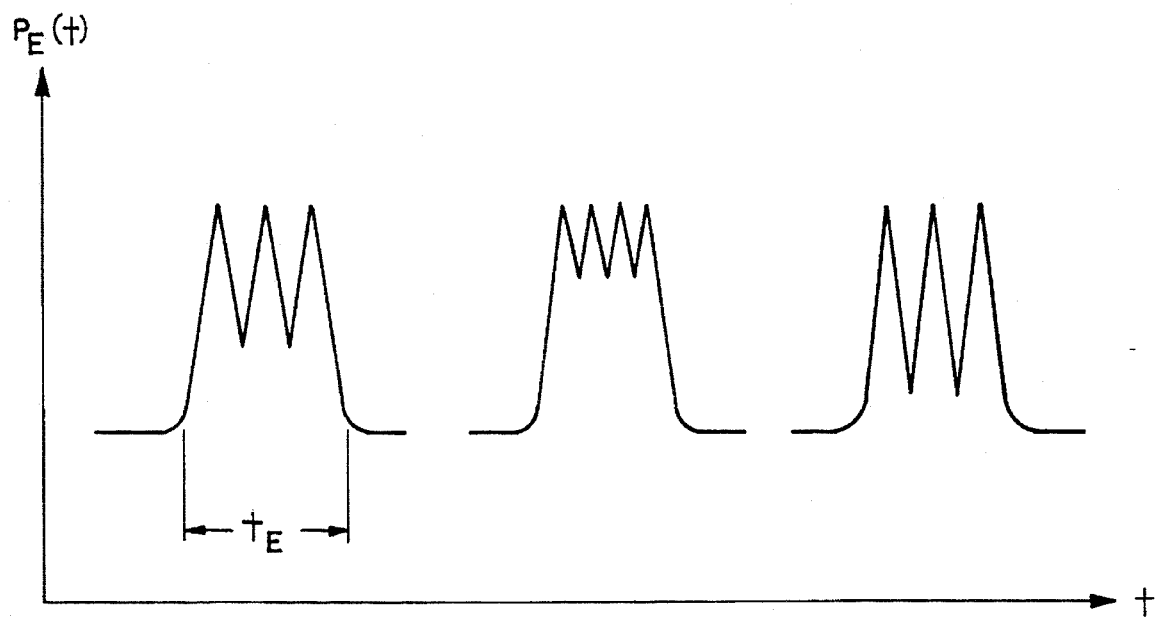
_Fig_16
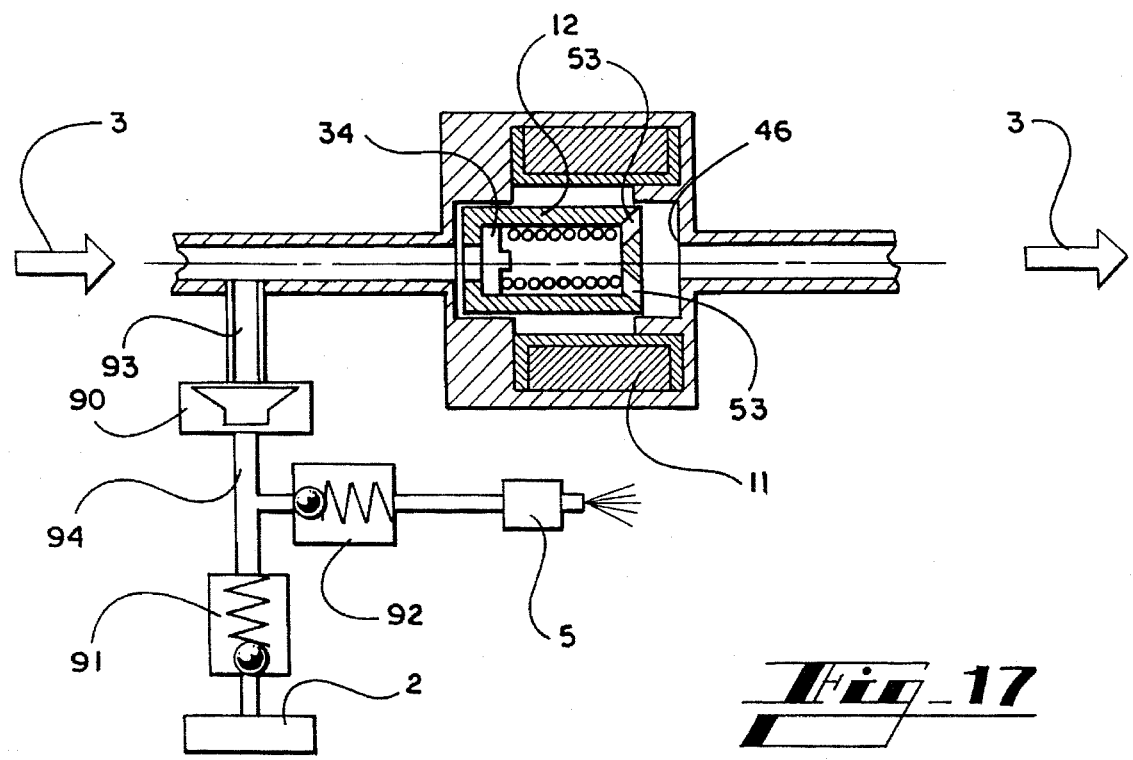
_Fig_17

FUEL INJECTION DEVICE FOR INTERNAL COMBUSTION ENGINES

The invention pertains to a fuel injection device for internal combustion engines.

Fuel injection devices for internal combustion engines are very common and have gained acceptance in practical applications in many different variations, all of which have different deficiencies.

Pumps with plungers or pistons that are activated by cams are customary for the direct injection of diesel fuel as well as the injection in the so-called precombustion chamber process, whereby the cams are arranged on a cam shaft that is directly driven by the crank shaft. The quantitative adjustment is facilitated by control edges machined into the pistons or plungers. Pumps of this type require a high operating power over the entire crank path of the internal combustion engine or the diesel engine, and may thus not be controlled electronically.

An injection device of the initially mentioned type may in comparison be regulated by an electronic control. The construction of such a known injection device is in the following described with reference to FIG. 1 in conjunction with FIGS. 2 and 3, which illustrate typical pressure profiles of the pressure impulse device by means of which fuel is supplied to the injection nozzle.

Fuel is fed from the fuel tank (1) into a fuel line (5) at a pressure between approximately 3 and 10 bar by means of a fuel pump (2), whereby a pressure regulator (3) and a damping device (4) are arranged in said line. A shut-off valve (6) which is, for example, activated electromagnetically is arranged at the end of the line (5), and the fuel accelerated by the pump (2) is returned to the fuel tank (1) via the shut-off valve if said valve is opened. The abrupt closing of the shut-off valve (6) transforms the kinetic energy of the fuel flowing through the line (5) as well as the line (7) into pressure energy. The intensity of the thus created pressure impulse is approximately between 20 and 80 bar, which in other words means approximately 10 times the flow pressure produced by the pump (2) in the line (5), which is also called the oscillation line. The pressure impulse created at the shut-off valve (6) is used for the ejection of the thus accelerated fuel via an injection nozzle (10), which is, via a pressure line (9), connected to the valve (6) and thus the line (5).

This known fuel injection device may be controlled electronically, i.e., by means of an electronic control unit (8) that is connected to the valve (6), due to the utilization of a shut-off valve that may be controlled electromagnetically, The pressure impulse produced in the pressure line (5) during the abrupt closing of the shut-off valve (6) travels through the lines (5,7 and 9) in the form of a pressure wave at the speed of sound, whereby the energy of the pressure wave in the lines (5 and 9) is available for the ejection of fuel via the nozzle (10). The pressure wave propagating in the oscillation line (5) is reflected at the outlet of the pump (2), and travels back to the shut-off valve (6). The duration of this direct pressure impulse phase corresponds with the duration in which the pressure wave travels through the oscillation line (5), and causes the pressure duration at the injection nozzle (10). After this direct pressure impulse phase, a residual pressure energy which travels back and forth in the oscillation line remains in the oscillation line (5). FIG. 2 illustrates a typical temporal profile of the pressure impulses in the oscillation line if no damping device (4) is arranged in the line (5). This pressure profile is characterized by a primary pressure wave with maximum energy and a subsequent secondary pressure wave with increasingly decreasing energy. Any of these pressure waves may basically cause an injection. However, the sequence of these pressure waves limits the obtainable operating frequency of the system, which is the reason why the secondary pressure waves are suppressed for the benefit of defined operating conditions. The damping device (4) which suppresses all secondary pressure waves and is arranged in the oscillation line (5) serves this purpose. A corresponding pressure profile is illustrated in FIG. 3, whereby said figure clearly indicates that the secondary pressure waves are, except for minute residual ripples, suppressed between the successive primary pressure waves.

As compared to the initially described fuel injection device which may not be controlled electronically, the conventional fuel injection device described in FIGS. 1 through 3 excels by its ability to be controlled electronically, whereby the characteristic of the injection pressure does not basically depend on the rotation speed of the internal combustion engine. A rapid opening and closing of the fuel injector, and thus a sufficient fuel atomization progression, may be obtained due to the steep pressure rise and pressure fall in the pressure impulse device.

One disadvantage of the previously described conventional fuel injection device can be seen from the fact that an admission pressure device is required which provides the energy required for the acceleration of the fuel-liquid column in the pressure line and which operates continuously.

This continuously operating admission pressure supply requires a corresponding effort to maintain the pressure at a constant level. The excess quantities of fuel conveyed by the pump (2) is for this purpose discharged via the pressure control valve (3) which is connected to the fuel tank (1) via a return line. This pressure discharge leads to a loss of energy, and thus to pressure fluctuations at the injection valve (6) in addition to an increase in fuel temperature, all of which substantially influences the accuracy of the injection process. The pressure control valve (3) in addition always requires a minimum discharge quantity in order to be able to operate in a stable manner, which in turn causes additional energy losses. Since the required quantity of fuel at the injector (10) depends on the rotation speed of the engine as well as the respective quantity to be injected, the pressure supply unit must already convey the quantity of fuel required for full load operation while idling, which means that relatively large quantities of fuel must be discharged via the pressure control valve (3), and that corresponding energy losses occur for the entire system.

The previously described injection device with a continuously operating pump is also suitable for injection in so-called intake manifold injection motors, but not for direct injection into the combustion chamber of spark ignition engines because this direct injection requires a substantially higher pressure level, which means that the power continuously required for the pump may no longer be within acceptable values, and that the pump would, due to the high pressures to be processed, additionally take on dimensions and weight unacceptable for motor vehicle engines.

This is the reason why in the past it was attempted to construct continuously operating injection devices, which means injection devices in which the pressure required for the injection process must no longer be available permanently, but only directly before or at the time at which it was required for the injection process. A device of this type is, for example, known from DE-PS 598,918. This known device is based on a heavy electromagnet which presses a plunger connected to the rotor into a displacement space during excitation, which in turn causes the fuel to be injected into the combustion chamber of the internal combustion engine via a nozzle. A shut-off valve is closed immediately before the injection process, and the shut-off valve then seals the displacement space against fuel intake. These known devices have the critical disadvantage that the high pressure levels required for a direct injection necessitates the use of a very large electromagnet, so that the entire device would require much space and be very sluggish, and thus be less suitable for engines in motor vehicles.

This known fuel injection device was subsequently further developed in order to obtain smaller types of construction. Corresponding injection devices are known from DD-PS 120,514 and DD-PS 213,472. These devices operate according to the system for storing kinetic energy. It is for this purpose suggested to accelerate the rotor of the electromagnet and thus the fuel-liquid column over a longer distance before the pressure required to inject the fuel via the nozzle is built up. These known devices are also designated as pump-nozzle elements that operate according to the solid body-energy storage principle.

According to DD-PS 120,514, the fuel delivery space penetrated by the delivery plunger is in a first section provided with axially extending grooves through which the fuel may be discharged without causing a substantial pressure build-up in the following second section of the fuel delivery space which is not provided with fluid discharge grooves.

The delivery plunger is thus decelerated by the incompressible fuel, which in turn leads to the fact that a pressure build-up occurs in the fuel by means of which the resistance of the injector valve is overcome, so that the injection of fuel may occur. One disadvantage of this system can be seen from the fact that high pressure losses which disadvantageously influence the pressure build-up required for the injection process occur during the penetration of the delivery plunger into the closed section of the delivery cylinder due to disadvantageous gap conditions, namely a large gap width and a small gap length. According to DE-PS 213,472, it was thus suggested to arrange an impact body in the delivery cylinder, so that the pressure loss may be maintained at acceptable levels despite relatively large gap widths. However, there is the additional disadvantage that the impact leads to excessive wear and tear of the impacting elements. The impact body is, due to the impact, excited to longitudinal oscillations which are transferred to the fuel, thus disadvantageously influencing the injection process with high-frequency pressure oscillations.

One critical disadvantage of both previously described solid body-energy storage injection devices can be seen from the fact that the injection of the fuel may only be controlled to a limited extent, which in other words means that it may only be adapted to the engine requirements to a limited extent.

EP-A-0 174,261 introduced a device to inject fuel into internal combustion engines via an injection nozzle in which the fuel is supplied by a pressure impulse device which is provided with a pump that accelerates the fuel and a device that delays the fuel. The activation of said impulse device abruptly transforms the kinetic energy of the accelerated fuel into an impulse wave that ejects the fuel via the injection nozzle, whereby the pump is an intermittently operating reciprocating pump. The return of the fuel into the fuel tank is executed in an open fuel circulation system. This known device may not be freely controlled. Such an open circulation system requires excessively high energy.

The invention is based on the objective to introduce a fuel injection device for internal combustion engines of the initially mentioned type by means of which fuel may be injected in a very rapid and precise manner with less optimally utilized energy, as well as independently from the engine conditions.

This objective is attained by driving the reciprocating pump electromagnetically and providing an electromagnetically-activated shut-off valve, whereby on common electronic control unit for the pump as well as the shut-off valve and a closed fuel circuit is provided. The closed fuel circuit connects an inlet chamber behind the delivery plunger of the pump, with the oscillation line space in front of that delivery plunger.

According to the invention, it is only suggested to make the quantity of fuel required for the injection process available as long as it is required in dependence on the engine conditions in regard to time and quantity. The continuous admission pressure supply according to the state of the art is eliminated due to utilization of an intermittently operating fuel acceleration pump, all of which represent positive factors in regard to the energy requirements of the injection device. The utilization of energy is according to the invention additionally optimized by using one common control device for the acceleration pump and the delay device which may be activated electrically, for example, in the form of a shut-off valve that may be activated electromagnetically.

A reciprocating pump that may be activated electromagnetically is preferably utilized as the intermittently operating fuel acceleration pump. A diaphragm pump to accelerate the fuel inside the pressure impulse device may also be utilized in an alternative variation. An electrodynamic drive, a mechanical drive, or a drive by means of piezo elements may additionally be utilized instead of an electromagnetic pump drive.

The common triggering of the pump and the delay device makes it possible not only to optimally adapt the control times of the pump and the delay unit to each other, but also to allow a control of the injection process dependent upon the respective fuel requirements, whereby said control is entirely independent of the operating conditions of the motor.

Originating from the injection device previously described in FIGS. 1 through 3 in which the delay device is constructed as a shut-off valve, the invention is advantageously realized by the fact that a closed injection system is provided in which the shut-off valve is connected to the inlet chamber behind the delivery plunger of the reciprocating pump. The reciprocating pump of the closed injection system also comprises an electromagnetic drive or solenoid drive, so that the reciprocating pump and the electromagnetic shut-off valve may be operated optimally via one common electronic control unit.

A reciprocating pump for the closed injection system that is constructed in a particularly simple fashion in regard to its structure as well as its triggering such that the delivery plunger forms one unit together with the rotor of the electromagnet. Identical sizes of the plunger face sides allow an acceleration of the plunger without any losses.

One substantial advantage of the closed injection system can be seen in the fact that only that particular quantity of fuel must be delivered from the fuel tank to the acceleration pump which was ejected during the previous injection cycle. As compared to the open injection system, the acceleration pump in the closed injection system must produce less energy for the delivery of fuel from the fuel tank, which represents a beneficial factor in regard to the energy requirement of the entire system. The closed injection system additionally utilizes the pressure impulse produced during the abrupt closing of the shut-off valve substantially better than an open injection system. Part of the pressure impulse is, via the return line, discharged into the fuel tank without being used in an open injection system as it is, for example, illustrated in FIG. 1, while this part of the pressure impulse is in the closed injection system according to the invention applied to the rear side of the pump plunger, and thus transferred to the ejected fuel. This measure also beneficially influences the total energy requirement of the injection system, which means that a correspondingly smaller construction of the fuel acceleration pump may be selected if so required.

The arrangement of the reciprocating pump and the shut-off valve in one common housing according to the invention additionally allows a drastic reduction in the structural size as well as a simplified structure of the injection device, particularly if the shut-off valve is also constructed as a solenoid. As an alternative, it is possible to provide a shut-off valve with an element constructed according to the Bernoulli effect which has a purely mechanical structure and thus requires no external energy supply.

For variations of the fuel injection device according to the invention which do not require a common electronic control of the pump and the delay device for special applications, it is suggested that the reciprocating pump itself be constructed as a delay device.

The invention discloses a fuel injection device according to the solid body-energy storage principle. In comparison to the initially described state of the art, according to which a return of the fuel occurs in a first stroke section of the reciprocating pump which is followed by a pressure build-up in the subsequent stroke section, the invention suggests to store the energy of the reciprocating pump in a closed delivery space along the entire delivery stroke, and to build up the pressure energy required for an ejection via the injection nozzle in such a way that the discharge of the displaced fuel is abruptly stopped by means of a shut-off valve. The shut-off valve is advantageously realized with an electromagnetic drive, so that the valve as well as the pump may be regulated in the required fashion via one common electronic control circuit. One substantial advantage of the solid body-energy storage principle realized according to the invention can be seen from the fact that the energy storing process, which means the acceleration of the plunger, may be controlled via the duration of the plunger pre-stroke without creating a substantial increase in pressure. The length and the sequence of the injection process may, depending on the respective engine conditions, be influenced in the required manner due to the possibility of a variable plunger pre-stroke, as well as to the fact that the driving magnet for the pump may after the closing of the shut-off valve in the fuel supply to the pump be switched on for differing durations and excited to differently high intensities during these durations. All pressure profiles required for individual instances may be realized by arbitrary combinations of the delivery pre-stroke and the subsequent displacement phase performed by the excited shut-off valve magnet.

The invention additionally creates a process to trigger an electromagnetic shut-off valve for the injection device according to the invention which is constructed in such a way that a rapid lifting of the valve, a controllable opening time, a rapid drop, constant lifting and dropping durations as well as a minute energy requirement is ensured.

Figure 15:
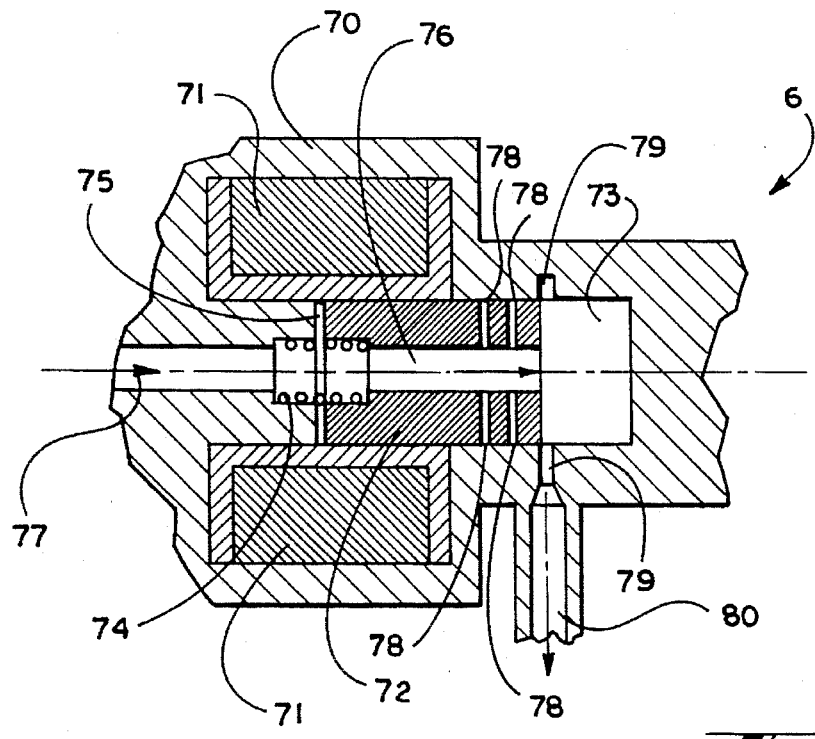
Figure 18:
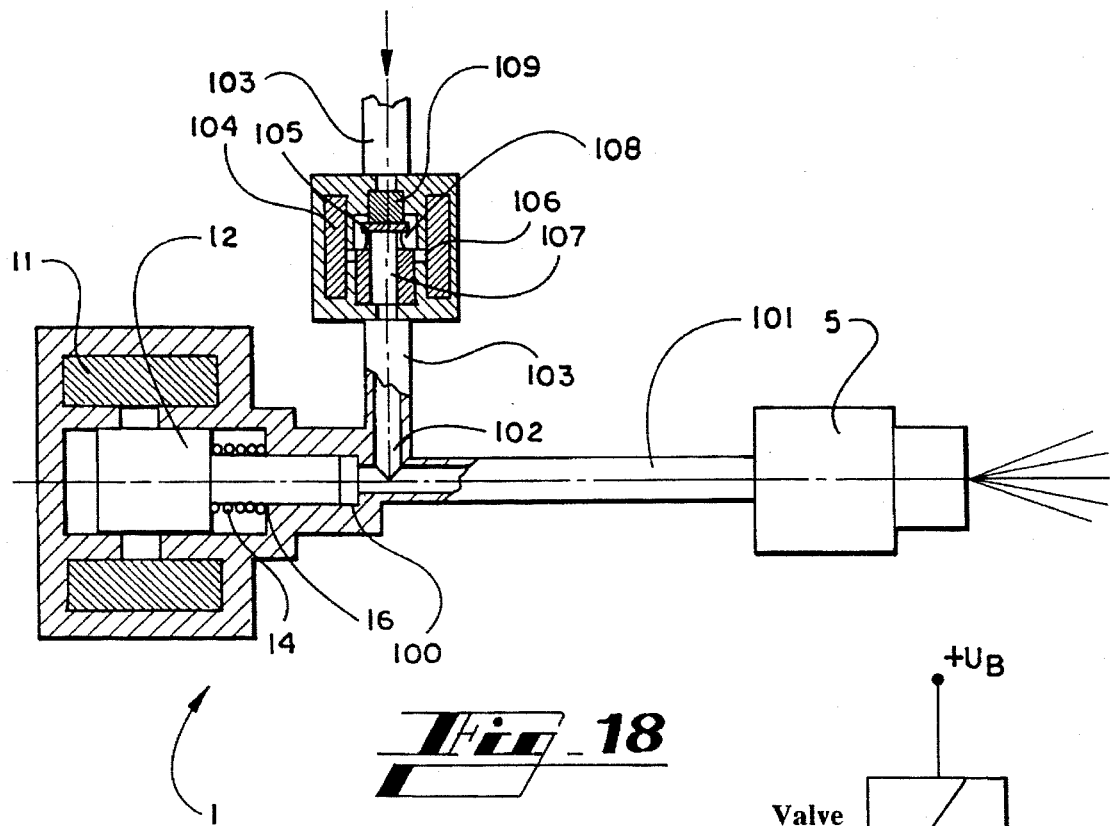
Figure 19:
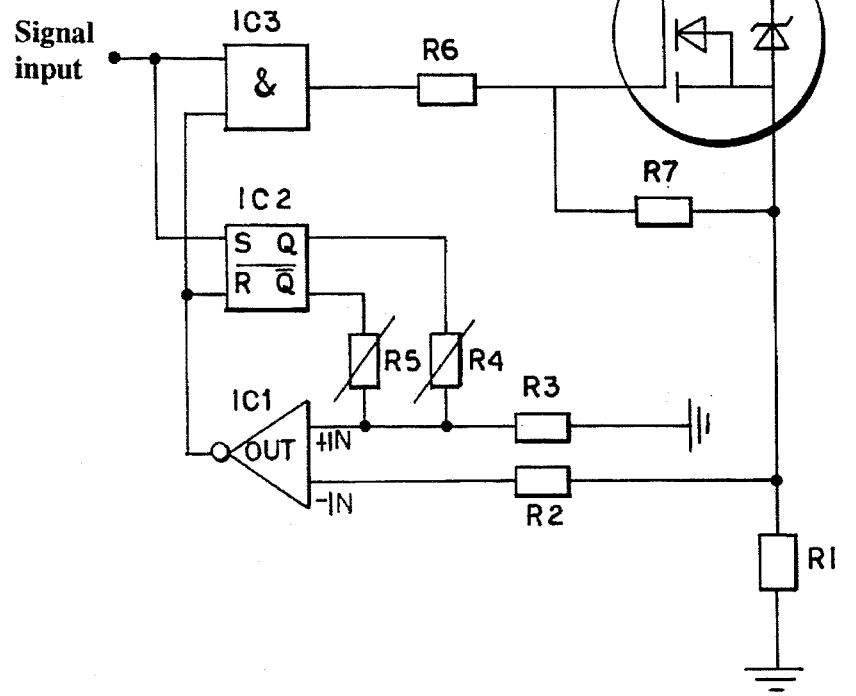

The invention is in the following described in detail with the aid of the figures; the figures show:

FIG. 1 a schematic representation of a conventional fuel injection device,

FIGS. 2 and 3 characteristic pressure profiles during the ejection of fuel by means of the device according to FIG. 1, FIG. 4 a schematic representation of a variation of a fuel injection device in which the fuel is returned into the fuel tank in an open fuel circulation system, FIG. 5 a schematic representation of a second variation of the fuel injection device according to the invention with a closed fuel circulation system, FIG. 6 a variation of the device according to FIG. 5, FIG. 7 a variation of the device according to FIG. 6 with uniform construction of the essential components of the device, FIG. 8 a variation of the fuel injection device according to the invention in which the delivery plunger and the shut-off valve are constructed of the same material, FIGS. 9 through 11 variations of the construction of the delivery plunger and the shut-off valves of the device according to FIG. 8 which consist of the same material, FIG. 12 a sectioned representation of a variation of the fuel injection device according to the invention with a uniform construction of the fuel acceleration pump, the shut-off valve, and the return valve in the pressure line to the injection nozzle, FIG. 13 a sectional representation of the device according to FIG. 12 rotated by 90°, FIG. 14 the construction of a damping device arranged in the oscillation line, FIG. 15 a preferred variation of the shut-off valve to produce a modulated pressure profile of the fuel ejected via the nozzle, FIG. 16 an illustration of the pressure profiles of the ejected fuel that may be obtained by means of the device according to FIG. 15, FIG. 17 an alternative variation of the fuel injection device according to the invention with a pressure impulse device that is constructed separately from the fuel system, FIG. 18 an additional variation of the fuel injection device according to the invention, and FIG. 19 a circuit diagram of an electronic control for the shut-off valve of the fuel injection device according to the invention.

FIGS. 1 through 3 were described initially in order to explain the state of the art.

Variations of the fuel injection device according to the invention are illustrated in FIGS. 5 through 18, whereby the same reference numerals were used for the same structural components.

The variation of a fuel injection device shown in FIG. 4 is based on a reciprocating pump (1) with electromagnetic drive for the intake of fuel from the fuel tank (2) as well as for the acceleration of the fuel in an acceleration line (3) which is, via a pressure line (4), connected to an injection nozzle (5). A shut-off valve (6) which is constructed as an electromagnetic valve and controls the quantity of fuel flowing through a return line (7) that is connected to the shut-off valve (6) and leads to the fuel tank (2) is arranged in a branch line between the acceleration line (3) and the pressure line (4). The triggering of the shut-off valve (6) as well as the reciprocating pump (1) is executed via one common electronic control unit (8) which is connected to the excitation coil of the magnetic valve (6) as well as to one coil of the driving electromagnet of the reciprocating pump (1). A return valve (9) is additionally arranged in the intake line (10) which connects the end of the acceleration line (3) on the pump side with the fuel tank (2).

The reciprocating pump (1) comprises a magnetic coil (11) with a rotor (12) arranged in the coil passage, whereby the rotor is constructed as a cylindrical body, for example, a solid body, and guided in a bore (13) in the housing that extends parallel to the central longitudinal axis of the toroid coil (11). The rotor is by means of a pressure spring (14) compressed to a stop position in which it adjoins the left end of the bore (13) in the housing with its rear face wall as shown in FIG. 4. The other face wall of the rotor (12) is stressed by the spring (14) which is braced against the wall of the housing of the pump (1) at the right end of the bore (13). The face side of the rotor (12) under pressure by the spring is rigidly connected to a piston rod (15), at the free end of which a plunger (16), specifically the delivery plunger of the pump (1), is attached. The plunger is guided along the inner wall of the oscillation line (5) and preferably sealed against this inner wall. The piston rod (15) penetrates a bore in the pump housing, the diameter of which is smaller than the diameter of the bore guiding the rotor (12).

The intake line (10) exits into the oscillation line (3) in front of the outer face surface of the delivery plunger (16). The return valve (9) in the delivery line (10) includes a sphere that is compressed by a spring as the valve element, whereby the sphere and the spring are arranged in such a way that the spherical valve element in the return valve is raised when the delivery plunger (16) performs its intake stroke to draw fuel from the tank (2), which means when the plunger (16) in FIG. 4 performs its movement towards the left. This instance occurs when the magnet (11) is excited and the rotor (12) is returned into its resting position by the spring (14). In the other instance, namely during the delivery stroke of the plunger (16) corresponding to the plunger movement towards the right in FIG. 4 while the electromagnet is excited, the valve element of the return valve (10) is moved into its shut-off position, so that the connection between the oscillation line (3) and the fuel tank (2) is interrupted. The mass of the fuel located in the oscillation line (3) is due to the delivery stroke of the plunger (16) accelerated, transferred into the return line (7), and from there into the fuel tank (2) via this return line during the opening phase of the shut-off valve (6), the duration of which is predetermined by the control device (8). This means that an acceleration of the fuel is during this duration primarily executed in the lines (3 and 7), and the fuel pressure is during this process so small that the nozzle (5), which is in conventional manner blocked hydraulically, assumes its shut-off position in which no fuel may be ejected via the nozzle.

Once the quantity of fuel in the oscillation line (3) (and the return line (7)) has reached an acceleration value that is predetermined by the control unit (8) in dependence upon actual engine conditions, the shut-off valve is also closed via the control device (8), so that the kinetic energy of the fuel flowing through the lines (3 and 4) is abruptly transformed into pressure impulse energy, the value of which is so high that the closing resistance of the nozzle (5) is overcome, and the fuel is ejected via the nozzle (5).

The injection device according to FIG. 4 represents an open system because a larger quantity of fuel is returned to the fuel tank (2) via the line (7) to the fuel tank (2) [sic] during the acceleration stroke of the delivery plunger (16) and drawn out of the fuel tank (2) during the intake stroke of the plunger (16), while the injection device according to the invention illustrated in FIG. 5 shows a device in which the fuel is recirculated to the pump (1), and only that particular quantity of fuel is drawn out of the fuel tank (2) during the intake stroke of the delivery plunger (16) which was ejected during the previous injection process via the nozzle (5). Such a closed circuit requires less driving energy from the pump (1) than an open system because a smaller mass of fuel has to be moved. One additional decisive advantage can be seen in the fact that the energy of the pressure impulse for the injection process, which is during the abrupt closing of the shut-off valve introduced into a return line, is also utilized.

The injection device according to FIG. 5 differs from the one according to FIG. 4 by a line (7) extending from the shut-off valve (6) to the rear side of the delivery plunger (16) (intake side) as well as by the fact that a return valve (17), which is switched in sequence with the return valve (9) and connects the front side of the plunger (delivery side) with the rear side of the plunger (intake side), is provided in addition to the return valve (9). The return valve (17) is designed in such a way that it assumes its closing position during the delivery stroke of the delivery plunger (16), so that a fluid compensation between the front and rear side of the plunger is performed.

The intake line (10) according to FIG. 4 is in FIG. 5 replaced by a line section (18) connecting the second return valve (17) with the oscillation line (3), whereby the other end of the return valve (17) is via a line section (18') connected to the line (7). A line section (19), in which the first return valve (9), the function of which corresponds with the return valve (9) according to FIG. 4, is arranged, is branched off from the line [7] and exits into the tank (2).

During the acceleration or delivery stroke of the delivery plunger (16), the fuel accelerated in the oscillation line (3) flows into the intake chamber behind the plunger (16) via the line (7) when the shut-off valve (6) is open. The return valve (9) is maintains its closed position via the fluid flowing in the line (7), and the second return valve (17) has the same pressure on both sides, i.e., via the line (7) and via the line (3), so that the spring element of this valve maintains its valve element in the closed position. Both return valves (9 and 19) also remain in their closed position when the shut-off valve (6) is closed abruptly. A pressure wave produced during the closing of the valve (6) does, in comparison with the variation according to FIG. 4, not only travel between the valve and the front side of the delivery plunger, but also between the valve (6) and the rear side of the delivery plunger (16) via the line (7), whereby this pressure component is added to the pressure component in the oscillation line in front of the plunger, so that the entire pressure potential induced to the fuel by the closing of the valve (6) is available to eject the fuel via the nozzle (5). The thus obtained energy in the injection system allows either a reduction in size of the pump (1), or, alternatively, a reduced current introduction into the driving magnet of the pump (1).

The effective surfaces of the plunger (16), namely the front and rear face side of said plunger, are differently sized due to the arrangement of the piston rod on the rear face surface, which is the reason why different pressures exist at both sides of the plunger (16). This pressure difference is compensated by a pressure accumulator (20) which is connected to the line (18').

During the delivery stroke of the plunger (16), the fuel flows into the oscillation line (3) via the line sections (18 and 18') from the rear side of the plunger while overcoming the resistance of the return valve (17), and only a minute quantity of fuel is drawn from the fuel tank (2) while overcoming the resistance of both return valves (9 and 19), namely a quantity that corresponds to the quantity of fuel ejected via the nozzle (5).

One variation of the fuel injection device shown in FIG. 5 is illustrated in FIG. 6. This injection device operates without a pressure accumulator (20) because the delivery plunger is combined with the rotor of the driving electromagnet. This means that both face sides of the plunger are equally large, so that the pressure on both sides of the plunger is equally high.

The rotor in FIG. 6 is thus constructed of the same material as the delivery plunger, which, as in the illustrated example, is attained by the fact that the delivery plunger (16) with the piston rod (15) according to FIG. 5 is omitted. An opening (21) is arranged on the rear side of the rotor in the pump housing in an extension of the rotor bore (13), whereby the line (7) is connected to said opening. The function of the device illustrated in FIG. 6 otherwise corresponds to the one in FIG. 5, which means that the pressure energy introduced into the line (7) during the closing of the valve (6) is transferred to the rear side of the rotor (12) acting as the delivery plunger, and that this pressure energy is available for the injection process in addition to the pressure impulse produced in the oscillation line (3) by the closing of the valve (6).

FIG. 7 shows a different variation of the injection device according to the invention illustrated in FIG. 6. The difference between these two variations consists of the fact that the reciprocating pump (1), the shut-off valve (6), and the second return valve (19) are, as a structural unit, arranged in one common housing, whereby the return valve (19) is integrated into the rotor/delivery plunger (12).

The pump (1) and the shut-off valve (6) are in the common housing (22) arranged behind each other on the central longitudinal axis of the housing. The shut-off valve (6), just like the pump (1), is provided with an electromagnetic drive including a coil (23), the current to Which is supplied via the common control unit for the shut-off valve and the pump, which is, however, not shown in FIG. 7. The excitation winding (23), just like the one for the pump, is constructed in an annular fashion and retained in a fitted recess of the housing (22) by means of a flange (24) which is rigidly connected to the housing (22). The winding (11) of the pump magnet is in similar fashion retained in a fitted bore of the housing (22) by a flange (25).

The flange (24) extends with a central section into the coil (23) and has a central bore (26) which is connected to the oscillation line (3) indicated by the arrows in the figure. The bore (26) is at the inner end widened in cross section, whereby the projection formed by the widening forms a support for a spring (27) serving as a return spring for the rotor (28) of the shut-off valve electromagnet. This rotor is accommodated in a bore arranged inside the housing (22), whereby said bore has a larger cross section than the bore (26), as well as a larger widened section. The rotor (28) is constructed as a hollow body and is on the side facing the bore (26) provided with a recess that has approximately the same cross section as the widening of the bore (26). A recess (29) with smaller cross section connects to this recess in the rotor (28), whereby the projection between the central bore (29) and the outer bore with larger diameter forms an additional support for the spring (27) which presses the rotor (28) into its resting position towards the right in FIG. 7 when the electromagnet is not activated.

The rotor (28) forms the valve element of the shut-off valve (6). The rotor (28) is for this purpose constructed with a peripheral slanted surface on its front side which engages with a correspondingly constructed conically extending annular surface (30) in the housing (22) if the shut-off valve electromagnet is excited. The channel (29) inside the rotor/valve element (28) exits via a number of channels (31) into the peripheral slanted surface of the front valve element portion which may engage with the valve seat (30) and thus prevents the discharge of fluid via the openings (31). If the shut-off valve electromagnet is excited, the valve element (28) is in its open position in which its conically extending front side is lifted from the valve seat (30), so that fluid may be delivered into the gap between the slanted surfaces that face each other via the openings (31), and from this gap into a bore (32) which exits into the bore (13) for the rotor/delivery plunger (12) of the pump (1). The bore (13) is arranged in the housing (22) as well as in the central section of the flange (25), and the rotor/plunger (12) is via the pressure spring (14) compressed to its stop position as it is, for example, shown in FIG. 5. This side of the bore for the plunger (12) is in the example according to FIG. 5 connected to the one end of the oscillation line (3), and the other end to the bore (26) in the flange (24).

The return valve (9) in the delivery line extending from the fuel tank (2) is connected to a bore (23) of the housing (22), whereby said bore exits into the bore (19) for the rotor/plunger (12) into which the connecting bore (32) also exits.

The rotor/plunger (12) is designed in hollow fashion, which means that it has a central bore, and is constructed as a valve element that performs the function of the second return valve (19) of the device according to FIGS. 5 and 6. The bore or the hollow space in the rotor/plunger (3) has three segments with different cross sections, i.e., a segment facing the connecting bore (32) with a small diameter that approximately corresponds to the one of the bore (32), a second segment with a larger diameter, inside of which a valve element (34) as well as a spring (35) which applies pressure to said element are arranged, and a third segment with an even larger diameter that exits into the front face side (at the right in FIG. 7), whereby a retaining ring (36) for the spring (35) is inserted into the projection area between this segment and the previous segment. The spring (35) is a pressure spring which applies pressure to the valve element (34) against the valve seat arranged as a projection between the two first mentioned segments of the bore for the rotor/plunger (12).

The function of the injection device according to FIG. 7 essentially corresponds to the one of the device according to FIG. 6, so we refer to the description of that figure for further detailed explanations.

FIG. 8 shows an integration of the function of the shut-off valve (6) of the fuel injection device according to the invention into the rotor (12) of the driving solenoid for the fuel acceleration pump (1), whereby said rotor is constructed as a delivery plunger, and the function of the illustrated arrangement approximately corresponds to the device according to FIG. 6. The second return valve (19) is not illustrated in FIG. 8. The integration of the shut-off valve function eliminates a control of the shut-off valve function in the delivery plunger via the control unit (8) as it is, for example, provided in the device according to FIG. 6. The integration of the shut-off valve function into the function of the pump (1) results in a substantial simplification of the injection device, and thus a substantial reduction of material in space requirements.

The rotor/plunger (12) is constructed as a solid cylindrical body and supported with the rear end in a bore (40) in the left portion of the pump housing in FIG. 8, while an additional bore with the same diameter guiding the front section of the plunger (12) during the delivery stroke of the same is arranged in the right portion of the pump housing.

A central recess (41), the base surface of which forms one of the two supports for the spring (14) to return the rotor (12), is arranged at the front face side of the rotor/plunger (12). The other support point for the spring (14) is formed by a projection between a bore (43) on the delivery side and a subsequent narrower bore (44), to which the end of the oscillation line on the pump side is connected. The spring (19) is, just as in the previously described variations of the device according to the invention, a pressure spring which applies pressure to the rotor/plunger (12) into its resting position in which it adjoins with its rear face surface an annular surface formed in the transition area from the bore (40) to a previous bore (45) with a smaller diameter, which is in turn connected to the oscillation line (3).

The projection or annular surface (46) in the transition area from the bore (41) with a larger diameter to the bore (43) with a smaller diameter serves as a stopping surface for the annular front face wall of the rotor/plunger (12) and interacts with the same in accordance with the function of the shut-off valve (6) of the previously described variations of the invention. This means that the rotor/plunger (12) adjoins the annular surface [46] after passing a stroke distance x which is determined by the distance between the front face surface of the rotor/plunger (12) in resting position and the annular surface (46), so that the acceleration of the fuel performed by the rotor/plunger (12) is abruptly interrupted, and the kinetic energy of the fluid is transformed into a pressure impulse, the intensity of which suffices to eject fuel via the injector nozzle (5) which is in the area of the bore (45) connected to the oscillation line (3), at the other end of which the fuel intake line with the return valve (19) is connected in the area of the bore (44).

Additional variations of an integrated delivery plunger/rotor/shut-off valve are illustrated in FIGS. 9 through 11. The production of a pressure impulse is in these variations also performed after the rotor/delivery plunger (12) passes a stroke distance in the range of x. While the shut-off valve function according to FIG. 9 is obtained by an impact of the rotor/plunger against a barrier arranged on the plunger stroke path similar to the variation according to FIG. 8, the realization of this function is in accordance with FIGS. 10 and 11 obtained by an abrupt interruption of the fuel acceleration via the sudden closing of flow baffles in the form of narrow bores.

The guidance of the rotor/plunger (12) in the variations according to FIGS. 9 through 11 is obtained in a similar fashion as in FIG. 8 in which two bores (40 and 41) are arranged at a distance from each other in the axial direction, whereby FIGS. 9 through 11 are otherwise based on the arrangement according to FIG. 8 but with the difference that the second return valve (19) is similar to the variation of the device according to the invention illustrated in FIG. 7 integrated into the rotor/plunger constructed as a hollow element. The same reference numerals were used for the same structural components of the devices illustrated in FIGS. 7 and 9 through 11.

In the variation according to FIG. 9, the inner face surface of the valve element (34) of the return valve (19) impacts after passing a stroke distance x against a pin (50) arranged on the central longitudinal axis of the rotor/plunger bores (40 and 41). This impact causes the pressure impulse previously described in connection with FIG. 8.

The acceleration of the fuel is in accordance with FIG. 10 executed via baffles in form of narrow bores (51 and 52) which are arranged in the area of the front end of the bore (41) in the delivery direction, and connected to the housing bore (44) that is in turn connected to the oscillation line. As illustrated in FIG. 10 by arrows, the fuel in the interior of the rotor/plunger (12) flows via the bore (51) extending perpendicularly to the delivery direction of the fuel into a bore (52) arranged in the pump housing at a distance from the aforementioned bore in the delivery direction, from there into the bore (44), and finally into the oscillation line. As soon as the annular front end of the rotor/plunger (12) has passed a stroke distance x, this portion of the plunger closes the radial openings (51), which means that the acceleration of the fuel is abruptly stopped, and a pressure impulse is produced.

FIG. 11 differs from the variation according to FIG. 10 in that the flow baffles are in the form of openings (53) arranged in a front face wall of the hollow rotor/plunger. After passing the stroke distance x, the front face wall of the plunger with the radial outer openings (53) adjoins the projection (46), which in turn causes an abrupt interruption of the fluid flow from the interior of the plunger into the bore (44), so that the kinetic energy of the flowing fuel is transformed into a pressure impulse that leads to the ejection of fuel via the injection nozzle.

FIGS. 12 and 13 illustrate an additional variation of the device according to the invention in which the shut-off valve is constructed as a hydraulic valve and combined with the pump (1) in one common housing. The oscillation line (3) is in this particular variation also integrated into the common housing.

The function as well as the essential structure of the pump (1) with electromagnetic drive essentially corresponds to the previously described variations of the injection device according to the invention, and the fuel intake line is connected to a connecting pipe (60) that is fitted into the pump housing (FIG. 13).

The shut-off valve (6) may in this particular variation not be controlled electromagnetically, but closes automatically at a certain flow speed due to the Bernoulli effect. The fuel flowing through the oscillation line (3) during the acceleration phase reaches the valve space (62) via a gap (61). A narrow annular gap which may be adjusted by appropriate designs of a spring (64) is arranged between the valve cone (63) and the corresponding valve seat. The fuel flows through this annular gap, and produces in accordance with the Bernoulli [effect] a lower static pressure than in the surrounding space at this location. The static pressure in the annular gap decreases at a certain flow speed to such an extent that the valve cone (63) is pulled, and the shut-off valve (6) closes abruptly, which in turn produces the pressure impulse required to eject the fuel via the injection nozzle. The pressure line leading to the injection nozzle is connected to the outlet of the return valve (65) which is also structurally combined with the arrangement illustrated in FIGS. 12 and 13.

The valve cone (66) of the valve (65) is via the a compressed spring (67) pressed against the respective valve seat, whereby the spring (67) is designed in such a way that the valve is closed if the pressure in the oscillation line (3) lies below a certain value that leads to the ejection of fuel via the injection nozzle. The formation of bubbles in the pressure line to the injection valve is prevented by the return valve (65) because this return valve prevents air from being introduced via the injection nozzle during a decrease of the ejection pressure, and fuel and air from being introduced into the pressure line.

The rotor/delivery plunger (7) is in the variations according to FIGS. 12/13 provided with radial slots (68 and 69) which have a different depth and are arranged over the entire periphery of the essentially cylindrical rotor. These slots prevent the formation of turbulence when the solenoid is excited, and thus contribute to a reduction in energy consumption.

FIG. 14 shows a preferred variation of a damping device (70) that may possibly be arranged in the oscillation line (3). The damping device (70) essentially consists of a return valve under pressure by a spring, whereby the valve plate (72) of said return valve which is under pressure by a spring (73) has a central bore with a smaller diameter (74). The damping device dampens oscillations that may occur when the pressure wave is reflected during impact against the rear side of the pump plunger and travels back through the oscillation line.

It is for some combustion processes practical to inject the fuel during each operating cycle several times in short succession as well as in defined quantities. The time between the individual pressure peaks may according to the invention amount to between a few 1/10 msec to a few msec. The quantity of pressure peaks may also be different depending on the requirements. Such a pressure characteristic can be particularly beneficial for a longer injection duration or for combustion in diesel engines.

The described pressure characteristic (see FIG. 16) may be obtained by repeated, multiple short-term closing and openings of the shut-off valve. However, a defined impact of the shut-off valve body against its seat may also be achieved. The discharge cross section of the shut-off valve (6) may also be alternately opened and closed during the closing movement. A correspondingly constructed variation is illustrated in FIG. 15. This valve is constructed as a valve that may be activated electromagnetically and includes a housing (70) in which the annular winding (71) of the electromagnet is enclosed. The rotor (72) of the solenoid is constructed as a valve element. The rotor (72) is arranged in a central bore (73) of the housing, and via a tension spring (74) compressed to its stop position where the rotor (72) adjoins a stopping surface (75) forming the one end of the bore (73) with its rear face surface. The rotor (73) is constructed in a hollow fashion, which means it includes a central bore (76) that extends through the entire rotor and approximately has the same cross section as the delivery bore (77). The diameter of the delivery bore (77) is widened at its end opposing the rotor (73), whereby an identical widening of the bore is arranged at the opposing end of the rotor (73) for its central bore (76). The projections at the end of the bore (77) and the opposing end of the rotor (73) formed by this widening of the diameter serve as supports for the tension spring (74). A number of radial slots (78) are arranged at a distance from each other in the axial direction at the front end of the plunger-shaped rotor or valve element (72). An annular groove (79) which exits into a discharge line (80) is arranged in the bore (73) for the rotor at the front end of the rotor (72) in the delivery direction.

The fuel flows from the delivery bore (77) into the discharge bore (80) through the central bore (76) when an excitation current flows through the coil (71), so that the rotor/valve element (72) adjoins the face surface (75) of the housing. If the excitation current of the coil (71) is switched off, the spring (74) presses the valve element (72) towards the right into the closing position. The annular groove (79) is during the closing movement (72) at first closed, so that a pressure impulse is created. During the further closing movement of valve element (72), the slots (78) arranged in radial fashion in the element (72) are situated and aligned in succession in a flush manner with the annular groove (79) and thus with the discharge bore (80), so that the pressure may at first be decreased until the annular groove (79) is again covered by the plunger-shaped element (72) during the further advance of the closing movement, and so forth. The number of obtainable injection pressure peaks is defined by the number of radial slots (78) arranged axially at a distance from each other, whereby the sequence of pressure peaks is defined by the axial distance of the slots (78) from each other. Typical pressure profiles that may be obtained with such a shut-off valve are illustrated in FIG. 16, whereby the extent of the pressure increase between successive pressure peaks depends on the axial width of the slots (78) in the valve element (72).

An additional variation of the fuel injection device according to the invention is illustrated in FIG. 17. The pressure impulse device is in this particular variation constructed separately from the fuel intake and ejection device. The pressure impulse device comprises a fluid acceleration pump (1) of the type illustrated in FIG. 11, whereby the function of the shut-off valve is integrated just as in the return valve (19). The pressure impulse device is constructed as a close system, which means that the oscillation line is connected to the pump intake and outlet, and a suitable incompressible fluid circulates in this circuit. This pressure impulse device is via a diaphragm device (90) connected to the fuel ejection device which in this particular instance includes two return valves (91 and 92) connected in series with the injection nozzle (5) in addition to the fuel tank (2) and the injection nozzle (5), whereby a branch line between the two return valves is connected to the diaphragm device (90), which is also connected to the oscillation line (3) of the separate pressure impulse device via a line (93). The return valves (91 and 92) are designed in such a way that the return valve (91) adjacent to the fuel tank (2) is displaced to its closing position by the fuel in the line section (94) when the diaphragm (30) is disengaged by a pressure impulse produced in the previously described manner by the pressure impulse device. The same mass of fuel opens the return valve (92) connected to the injection nozzle (5) via the applied pressure, so that fuel is ejected via this nozzle. The diaphragm of the diaphragm device (90) returns after the end of the pressure impulse into its starting position, so that a vacuum is created in the line section (94), by means of which the return valve (92) is closed, and the return valve (91) is open while drawing fuel from the fuel tank (2).

FIG. 18 illustrates an additional variation of the fuel injection device according to the invention which operates according to the solid body-energy storage principle.

The arrangement according to FIG. 18 also includes a pump (1), the design of which essentially corresponds to that of the pump (1) of FIG. 4, but with the exception that the delivery plunger is not separated into a plunger and a rod; the plunger (16) is rather directly connected to the rotor (12). The plunger (16) penetrates the displacement space (100). A pressure line (101) is connected to the displacement space (100), whereby the other end of the pressure line is connected to the injection valve (5).

The pressure line (101) is at the beginning of the pressure line (101) in the immediate vicinity of the displacement space (100) provided with an opening (102) to which a fuel supply (103) is connected. A shut-off valve (104) is arranged in the fuel supply line (103). The shut-off valve (104) has a valve plate (105) under pressure by a spring which is connected to the rotor (106). The rotor (106) has a central bore (107) and a bore (108) which is arranged perpendicular to the aforementioned central bore. The shut-off valve (104) is opened in the stop position, which means the rotor (106) is via a spring (109) pressed into a final position in which the fuel is able to flow from the not-shown end of the supply line (103) originating from a not-shown fuel tank to the pressure line opening (102) around the valve plate (105) via the bores (108) and (107).

The injection process according to the invention is performed as follows. Once the pressure line (101) is entirely filled with fuel, the magnetic coil (11) is at a suitable time excited, which excitation in turn accelerates the rotor (12) out of its final position, and the plunger (16) penetrates the displacement space which is also filled with fuel. The fuel displaced by the plunger (16) flows through the oscillation line opening (102), the central bore (107), the transverse bores (108), and the portion of the line (103) on the side of the tank. The shut-off valve is activated at a certain time, whereby the valve plate (105) adjoins its valve seat and thus locks the valve. This in turn causes the oscillation line opening (11) to be closed, so that no additional fuel may be discharged from the displacement space (100)/pressure line (101). The plunger (16) and the rotor (12) are subsequently abruptly decelerated and release the kinetic energy stored in the said elements to the incompressible fuel. This process creates a pressure wave by means of which fuel is ejected from the pressure line (101) via the injection valve (5) which is in conventional manner constructed hydraulically and under pressure by a spring.

The triggering of the reciprocating pump (1) and the shut-off valve (104) is performed by one common not-shown control circuit that might also be designed in such a way that the magnetic coil (11) of the pump (1) remains excited for a certain period of time after the closing of the valve (104). It is essential that the delivery valve (104) as well as the pump (1) be controlled so that the quantity of injected fuel as well as its pressure profile may be influenced almost arbitrarily due to a variable admission stroke of the plunger (16) of the pump (1), which means the stroke when the valve (104) is opened, as well as due to the fact that the driving magnetic coil (11) of the pump (1) may after the closing of the delivery valve (104) be switched on for different periods of time and with different high intensities. This measure makes it possible to optimally adapt the injection process to the given engine as well as to its operating conditions.

FIG. 19 finally shows a circuit according to the invention to trigger the electromagnetically controllable shut-off valve for the fuel injection device according to the invention.

In order to properly trigger a shut-off valve for the device according to the invention during the short period of time available with high-speed engines, the following requirements must be fulfilled:

The magnetic valve or shut-off valve must lift very rapidly (lifting time less than approximately 1.5 msec), the opening time must be controllable (approximately 0.5–6 msec), the magnetic valve must drop or close rapidly (approximately 3 msec), and the lifting and dropping times should be constant at all operating conditions and require only little energy.

In order to obtain a very short closing time, the invention suggests to trigger the magnetic valve with such a high current that the magnetic valve would be destroyed if this high current continued to flow during the open time.

The invention thus suggests to reduce the high making current after the closing of the valve to a substantially lower holding current.

This means that a high current is supplied during the opening process of the valve, whereby said high current is reduced as soon as the valve has opened. FIG. 19 shows a circuit for the realization of such a process—high making current and low holding current.

The circuit is in this particular instance designed for a valve which is opened in its resting position, which means when the plunger is in its final position under pressure by a spring.

The circuit consists of a series circuit including the magnetic winding of the valve, the drain-source path of the switching transistor (Q1) in the form of a MOSFET, and the return valve.

The voltage drop across the resistance of the return valve serves as a measurement of the current flowing through the magnetic winding of the valve.

The circuit is additionally provided with an operational amplifier (IC1) connected as a comparator, whereby the voltage which represents the current that flows in the valve winding and dropped across via the resistance of the return valve is applied to the input of said operational amplifier via a resistor (R2).

A voltage drop across the resistor (R3) is applied to the second input of the comparator or operational amplifier (IC1). The resistor (R3), depending on the state of the flip-flop (IC2), is connected to either a potentiometer (R4) or a potentiometer (R5) to form a voltage divider.

The gate terminal of the MOSFET (Q1) is triggered via a resistor (R6) that is connected to the output of an AND-gate (IC3). Both inputs of the AND-gate are connected to a signal input [of the flip-flop] [one input is connected to] the output of the comparator (IC1).

The signal input leads to the set input of the flip-flop (IC2), and the output of the comparator (IC1) is connected to the reset input of the flip-flop (IC2).

The function of this circuit is described in the following. No signal is applied to the signal input in resting condition. The valve is in its resting position, which means that no current flows through the magnetic coil. The switching transistor (Q1) is cut-off, and there is a [sic; no] voltage drop across the resistance of the return valve. The output of the comparator (IC1) is switched to LOGIC 1. If a voltage that corresponds with LOGIC 1 is applied to the signal input, LOGIC 1 appears at both inputs of the AND-gate (IC3) so that the switching MOSFET (Q1) is driven via (R6) and thus switches through.

LOGIC 1 simultaneously appears at the set input of the flipflop (IC2), so that a voltage appears across the voltage divider consisting of (R4) and (R3). The voltage drop via (R3) serves as a measure for the maximum making current. The closing current slowly builds up due to the inductance of the magnetic coil of the valve until the voltage drop via the return valve is larger than the voltage drop via (R3). As soon as the voltage drop via the return valve is larger than the voltage drop via (R3), the output of the comparator (IC1) switches to LOGIC 0. The flip-flop (IC2) thus changes state, so that the voltage divider formed by (R3) and (R5) becomes activated. The voltage drop via (R3) is proportional to the holding current.

The output of the AND-gate (IC3) is simultaneously switched to LOGIC 0, so that the switching transistor (Q1) is at first cut-off.

Since the switching transistor (Q1) is cut-off, no voltage is dropped via the return valve, so that the comparator output is again switched to LOGIC 1. The state of the flip-flop (IC2) is no longer altered. The output of (IC3) is again switched to LOGIC 1, which means that the switching transistor (Q1) is again enabled. A current again flows through the coil of the magnetic valve until this current becomes sufficiently high that the voltage drop via the return valve is larger than the voltage drop via (R3), which is now determined by the voltage divider (R3/R5).

The circuit generates in this manner a repeated holding cycle, whereby the holding current may be determined by adjusting the resistor (R5).

The inertia of the masses of the shut-off valve lead to the fact that the valve remains in its closed position despite the timed holding current, and that no undesired decreases occur.

As soon as the signal input is switched to LOGIC 0, the holding current is switched off, and the valve drops into its open position.

Two differently adjustable (i.e., via R4 and R5) reference voltages are made available to the comparator (IC1) by the flip-flop (IC2). As long as the input signal applied to the signal input is LOGIC 1, the comparator (IC1) times the switching transistor via the AND-gate (IC3) once an adjusted maximum current has been reached. The flip-flop also changes states during the first timing process. This means that a high current followed by a low maximum current (=holding current) is provided in this manner.

This mode of operation facilitates a rapid opening of the valve without the risk that the current required for this purpose destroys the valve while holding the same.

I claim:

1. Device to inject fuel into internal combustion engines with an injection nozzle to which fuel is supplied by means of a pressure impulse device that comprises an intermittently operating reciprocating pump that accelerates the fuel and a shut-off valve that delays the flow of fuel, whereby the activation of said shut-off valve transforms the kinetic energy of the accelerated fuel into an impulse wave abruptly ejecting the fuel via the injection nozzle, characterized by the fact that the reciprocating pump (1) is driven electromagnetically, and that the shut-off valve (6) is an electromagnetically activated valve, whereby one common electronic control unit (8) for the pump (1) as well as the shut-off valve (6) and a closed fuel circuit are provided, and the closed fuel circuit connects an inlet chamber behind a delivery plunger (16) of the pump (1) with an acceleration line space in front of the delivery plunger (16) of the pump (1).

2. Device according to claim 1, characterized by the fact that the shut-off valve (6) is connected to a branch line of the acceleration line (3) connecting the pump (1) with the injection nozzle (5), that the shut-off valve allows a discharge of the accelerated fuel from the acceleration line (3) into the branch line in opened condition, that the shut-off valve produces a pressure impulse wave during the abrupt closing of said valve by means of which the fuel is ejected via the injection nozzle (5), and that a displacement space in front of the delivery plunger (16) of the reciprocating pump (1) is connected to the acceleration line (3) as well as a fuel tank via a return valve (9), so that fuel flows into the displacement space and thus into the oscillation line (3) from the fuel tank during the resetting of the plunger (16).

3. Device according to claim 2, characterized by the fact that the inlet chamber behind the delivery plunger (16) is connected to the displacement space in front of the plunger (16) via a return valve (17), so that fuel may flow out of the inlet chamber into the displacement space during the resetting of the plunger (16).

4. Device according to claim 3, characterized by the fact that the reciprocating pump (2) includes a solenoid drive, a rotor (12) of which is connected to the delivery plunger (16) via a piston rod (14).

5. Device according to claim 4, characterized by the fact that the rear side of the delivery plunger is additionally connected to a pressure accumulator (20) in order to compensate the pressure difference resulting from the difference in surface area between the full-surface front side of the plunger and the annular surface of the rear side of the plunger caused by the connection of a piston rod (14) to the plunger (16).

6. Device according to claim 1, characterized by the fact that the drive of the reciprocating pump (1) is provided with a solenoid, the rotor (12) of which is constructed as a delivery plunger with two equally large face sides.

7. Device according to claim 1, characterized by the fact that the reciprocating pump (1) and the shut-off valve (6) are constructed as one structural unit.

8. Device according to claim 7, characterized by the fact that the reciprocating pump (1) and the shut-off valve (6) are arranged in a common housing (22) and each consists of solenoids that are arranged directly adjacent to each other, whereby the rotors (12) and (28) of the solenoids are constructed as delivery plungers or as plunger-shaped valve elements.

9. Device according to claim 8, characterized by a coaxial arrangement of the delivery plunger (12) and the plunger-shaped valve element (28).

10. Device according to claim 9, characterized by the fact that the outlet of the shut-off valve (6) is connected to the rear inlet chamber of the pump (1) via a short channel (32), whereby one additional channel (33), which may be connected to the return valve that is in turn connected to the fuel tank (2), exits into said inlet chamber.

11. Device according to claim 8, characterized by the fact that the valve element of the shut-off valve (6) is a hollow plunger (28) which is reset by a spring and provided with fluid outlet openings (31) on its front end which exit into transverse surfaces of the plunger (28), whereby said transverse surfaces may engage with corresponding transverse surfaces (30) at the front end of a bore accommodating the plunger (28) in a sealing manner.

12. Device according to claim 11, characterized by the fact that the transverse surfaces at the front end of the plunger (28) as well as at the opposing end of the plunger bore are conical surfaces.

13. Device according to claim 8, characterized by a return valve (34, 35) connecting the inlet chamber located behind the delivery plunger (12) with the displacement space located in front of the delivery plunger (12) is integrated into the delivery plunger (12).

14. Device according to claim 13, characterized by the fact that the return valve (34,25) includes a valve element (34) which is arranged in a penetration bore or central bore of the delivery plunger (12) and pressed against a valve seat at the rear end of the hollow space of the delivery plunger in the delivery direction by means of a spring (35).

* * * * *